(12) United States Patent
Sherman et al.

(10) Patent No.: US 11,140,046 B2
(45) Date of Patent: Oct. 5, 2021

(54) OFFLINE UPDATES FOR NATIVE MOBILE APPLICATIONS

(71) Applicant: ServiceNow, Inc., Santa Clara, CA (US)

(72) Inventors: Oleg Yakov Sherman, Gedera (IL); Kyle James Barron-Kraus, East Lansing, MI (US); Sean Andrew Bradley Bowrin, Oceanside, CA (US)

(73) Assignee: ServiceNow, Inc., Santa Clara, CA (US)

( * ) Notice: Subject to any disclaimer, the term of this patent is extended or adjusted under 35 U.S.C. 154(b) by 288 days.

(21) Appl. No.: 16/058,082

(22) Filed: Aug. 8, 2018

(65) Prior Publication Data

US 2020/0052976 A1 Feb. 13, 2020

(51) Int. Cl.
| | | |
|---|---|---|
| *H04L 12/24* | (2006.01) | |
| *G06F 9/451* | (2018.01) | |
| *G06F 3/0481* | (2013.01) | |
| *H04L 29/08* | (2006.01) | |

(52) U.S. Cl.
CPC ............ *H04L 41/22* (2013.01); *G06F 3/0481* (2013.01); *G06F 9/451* (2018.02); *H04L 67/24* (2013.01)

(58) Field of Classification Search
CPC ....... H04L 41/22; H04L 67/24; G06F 3/0481; G06F 9/451
See application file for complete search history.

(56) References Cited

U.S. PATENT DOCUMENTS

| | | |
|---|---|---|
| 6,609,122 B1 | 8/2003 | Ensor |
| 6,678,887 B1 | 1/2004 | Hallman |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,272,782 B2 | 9/2007 | Sneh |
| 7,610,512 B2 | 10/2009 | Gerber |

(Continued)

OTHER PUBLICATIONS

JavaScriptCore, Apple Developer Documentation, downloaded from https://developer.apple.com/documentation/javascriptcore on Jul. 9, 2018.

*Primary Examiner* — William L Bashore
*Assistant Examiner* — Gregory A Distefano
(74) *Attorney, Agent, or Firm* — Fletcher Yoder PC

(57) ABSTRACT

A wireless communication device may include a communication interface, a screen configured to display a graphical user interface (GUI) of a native application, a processor, and memory containing instructions of the native application that, when executed by the processor, cause the wireless communication device to perform operations including: requesting and receiving, by way of the communication interface, data that defines content for display on the GUI, an arrangement of the content, and a script; displaying the content in accordance with the arrangement; receiving input that modifies some of the content as displayed; determining that the wireless communication device is in an offline mode; invoking execution of the script; and while the wireless communications device is in the offline mode: (i) obtaining, as a result of the execution of the script, modifications to the content, and (ii) displaying, on the GUI, the content as modified in accordance with the arrangement.

18 Claims, 15 Drawing Sheets

(56) References Cited

U.S. PATENT DOCUMENTS

| | | |
|---|---|---|
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,140,617 B1 * | 3/2012 | Ewe ................ H04L 67/2861 709/203 |
| 8,224,683 B2 | 7/2012 | Manos |
| 8,250,169 B2 | 8/2012 | Beringer et al. |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,726,176 B2 | 5/2014 | Beringer |
| 8,743,121 B2 | 6/2014 | De Peuter |
| 8,887,133 B2 | 11/2014 | Behnia |
| 8,913,076 B1 * | 12/2014 | Aggarwal .............. G09G 5/14 345/593 |
| 9,239,857 B2 | 1/2016 | Trinon |
| 9,535,737 B2 | 1/2017 | Joy |
| 9,557,969 B2 | 1/2017 | Sharma |
| 9,760,897 B2 * | 9/2017 | Carter ................ G06Q 30/0201 |
| 9,792,387 B2 | 10/2017 | George |
| 2002/0120529 A1 * | 8/2002 | Buettgenbach .... G06Q 30/0601 705/26.1 |
| 2004/0012625 A1 | 1/2004 | Lei et al. |
| 2005/0070259 A1 * | 3/2005 | Kloba ............... H04M 1/72445 455/414.2 |
| 2005/0188051 A1 * | 8/2005 | Sneh .................... G06F 9/44526 709/213 |
| 2007/0078950 A1 * | 4/2007 | Hopkins ................ H04L 67/02 709/217 |
| 2008/0147671 A1 | 6/2008 | Simon et al. |
| 2009/0031225 A1 * | 1/2009 | Toebes .................... G06F 40/14 715/760 |
| 2013/0198361 A1 * | 8/2013 | Matsuzaki ............ G06Q 50/01 709/223 |
| 2014/0033011 A1 * | 1/2014 | Wandeler .............. G06F 40/186 715/222 |
| 2014/0245015 A1 | 8/2014 | Velamoor et al. |
| 2015/0161714 A1 * | 6/2015 | Fainshtein ......... G06Q 30/0269 705/14.58 |
| 2017/0126638 A1 | 5/2017 | Ye et al. |
| 2019/0149619 A1 * | 5/2019 | Lisac .................... G06F 9/547 709/203 |

* cited by examiner

Incident

INC0000015
I CAN'T LAUNCH MY VPN CLIENT SINCE THE LAST SOFTWARE UPDATE
OPENED: 2018-02-16 23:38:46
USER: BRYAN JONES

LOCATION
123 MAIN STREET, ANYTOWN, USA

CATEGORY
SOFTWARE

ASSIGNED TO
SYSTEM ADMIN

PRIORITY
CRITICAL

STATE
RESOLVED

FIG. 8C

Incident

Resolve
Reassign
Change category
Change priority

INC0000015
I CAN'T LAUNCH MY VPN CLIENT SINCE THE LAST SOFTWARE UPDATE
OPENED: 2018-02-16 23:38:46
USER: BRYAN JONES

LOCATION
123 MAIN STREET, ANYTOWN, USA

CATEGORY
SOFTWARE

ASSIGNED TO
SYSTEM ADMIN

PRIORITY
CRITICAL

STATE
IN PROGRESS

```
{
                    "Type": "ViewGroup",
                    "Margin": {
                    "Top": 11
      900           },
          ↘         "Orientation": "Horizontal",
                    "Alignment": "Center",
                    "Distribution": "Auto",
                    "Children": [
                          {
                          "Type": "Text",
                          "Width": 81,
                          "Margin": {
                          "Right": 5
                          },
                          "Text": "User",
                          "TextColor": "#92a3b0",
                          "TextAlignment": "Left",
                          "MaxLines": 1,
                          "Font": {
                          "Weight": "regular",
                          "Size": 13
                          }
                          },
                          {
                          "Type": "Image",
                          "CornerRadius": 11,
                          "Height": 22,
                          "Width": 22,
                          "Margin": {
                          "Left": 10
                          },
                          "CellId": "caller_image",
                          "Scaling": "Fill"
                          },
                          {
                          "Type": "Text",
                          "Margin": {
                          "Left": 9
                          },
                          "Text": "PLACEHOLDER",
                          "CellId": "caller_id",
                          "TextColor": "#4f5966",
                          "TextAlignment": "Left",
                          "MaxLines": 1,
                          "Font": {
                          "Weight": "regular",
                          "Size": 13
                          }
                          }
                          ]
                    }
```

FIG. 9A

```
"ItemViewCells": [
                            {
                            "ImageURL": {
                            "RedirectURL": "4f718bc1db925300e897769e0f96196b.iix",
                            "AccessViaToken": true,
                            "IsRelative": true
                 902        },
                            "Title": "Priority image",
                            "Id": "priority_image",
                            "Type": "Image"
                            },
                            {
                            "Value": "INC0000015",
                            "Title": "Number",
                            "Id": "number",
                            "Type": "Text"
                            },
                            {
                            "Value": "I can't launch my VPN client since the last software update",
                            "Title": "Brief description",
                            "Id": "brief_description",
                            "Type": "Text"
                            },
                            {
                            "Date": "2018-02-16 23:38:46",
                            "DateFormat": "yyyy-MM-dd HH:mm:ss",
                            "Milliseconds": 1520235526000,
                            "Title": "Opened",
                            "Id": "opened_at",
                            "Type": "Date"
                            },
                            {
                            "ImageURL": {
                            "RedirectURL": "8f590e66ff021300f1f2883b73e11c31.iix",
                            "AccessViaToken": true,
                            "IsRelative": true
                            },
                            {                              {
                            "Value": "Bryan Jones",
                            "Title": "User",
                            "Id": "user_id",
                            "Type": "Text"
                            }
                            ]
```

FIG. 9B

```
908
        function Resolve(targetitem, "Resolved")
            for item in dataitems:
                if item->id is targetitem:
                    for cell in cellitems:
                        if cell->id is "state":
                            cell->value = "Resolved"
                            return
```

OFFLINE UPDATES FOR NATIVE MOBILE APPLICATIONS

BACKGROUND

Native mobile applications are programs specifically designed to execute on the operating system of a mobile device, such as a mobile phone, tablet, smartwatch, or any other type of wireless communication device. Such native applications may be pre-packaged with the device or downloaded to the device at a later time. These applications may allow access to data of a web site or server, and may present this data in a customized fashion on a graphical user interface. This, and the ability for native applications to request specific subsets of the data that is to be presented, results in these applications having numerous advantages over accessing the same data by way of a web browser.

Nonetheless, native applications (and web browser based access as well) suffer from the inherent unreliability of the communication channel between the wireless communication device and the web server. From time to time, the wireless communication device may experience poor coverage or be out of coverage completely. In some cases, the user may intentionally place the wireless communication device in an offline mode by disabling one or more of its communication interfaces. When offline, the user experience of the native application suffers because the native application may be unable to update its graphical user interface to reflect changes made by the user and to the data displayed thereon.

SUMMARY

In order to provide a responsive user interface when offline, a native application may request and receive information for display from a server device. This information may include the content to be displayed (e.g., text and images), an arrangement of the content (e.g., an ordering and/or screen locations of the text and images), and one or more scripts that define how the content and/or arrangement is to be updated when the user performs specific activities.

When a wireless communication device executing the native application is determined to be offline and user input is received (e.g., by way of a graphical user interface), the device executes the appropriate script. The script instructs the device to update how the content and/or arrangement thereof are displayed so that the user interface appears responsive to the input. When the device is online once again, the native application may automatically or proactively transmit a representation of the update to the server device. In this manner, whether the device is online or offline may be transparent to the user, and the user is able to be productive even when the device is offline.

Accordingly, a first example embodiment may involve a wireless communication device comprising: a communication interface, a screen configured to display a graphical user interface of a native application, a processor, and memory containing instructions of the native application that, when executed by the processor, cause the wireless communication device to perform operations. The operations may include requesting and receiving, by way of the communication interface, data from a server device, where the data defines content for display on the graphical user interface, an arrangement of the content, and a script. The operations may further include displaying, on the graphical user interface, the content in accordance with the arrangement. The operations may further include receiving, by way of the graphical user interface, input that modifies at least some of the content as displayed. The operations may further include determining that the wireless communication device is in an offline mode. The operations may further include, possibly in response to receiving the input and the wireless communication device being in the offline mode, invoking execution of the script. The operations may further include, while the wireless communications device is in the offline mode: (i) obtaining, as a result of the execution of the script, modifications to the content, and (ii) displaying, on the graphical user interface, the content as modified in accordance with the arrangement.

A second example embodiment may include requesting and receiving, by a native application executing on a wireless communication device, data from a server device, where the data defines content for display on a graphical user interface of the native application, an arrangement of the content, and a script. The second example embodiment may further include displaying, on the graphical user interface, the content in accordance with the arrangement. The second example embodiment may further include receiving, by way of the graphical user interface, input that modifies at least some of the content as displayed. The second example embodiment may further include determining that the wireless communication device is in an offline mode. The second example embodiment may further include, possibly in response to receiving the input and the wireless communication device being in the offline mode, invoking, by the native application, execution of the script. The second example embodiment may further include, while the wireless communications device is in the offline mode: (i) obtaining, as a result of the execution of the script, modifications to the content, and (ii) displaying, on the graphical user interface, the content as modified in accordance with the arrangement.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A depicts a graphical user interface, in accordance with example embodiments.

FIG. 8B depicts a graphical user interface, in accordance with example embodiments.

FIG. 8C depicts a graphical user interface, in accordance with example embodiments.

FIG. 8D depicts a graphical user interface, in accordance with example embodiments.

FIG. 9A is part of an example JSON file defining a graphical user interface, in accordance with example embodiments.

FIG. 9B is part of an example JSON file defining a graphical user interface, in accordance with example embodiments.

DETAILED DESCRIPTION

Figure 1:
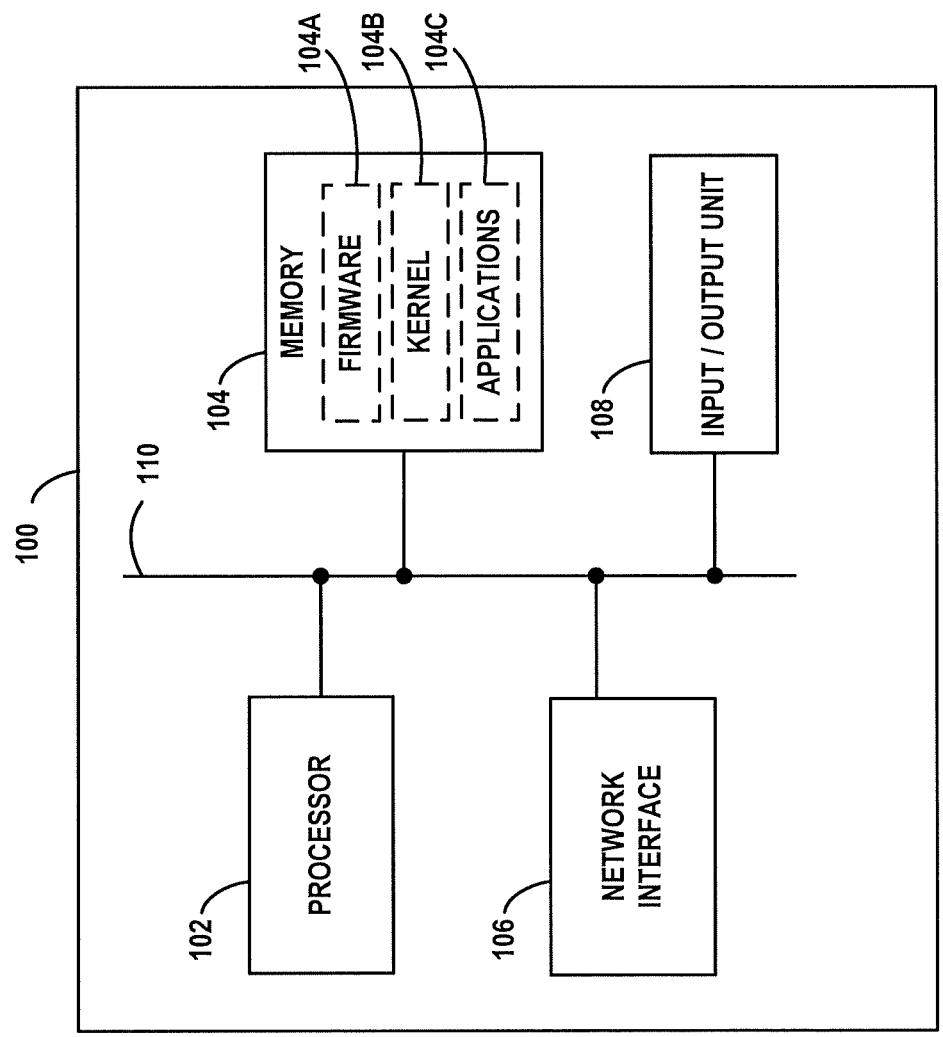
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
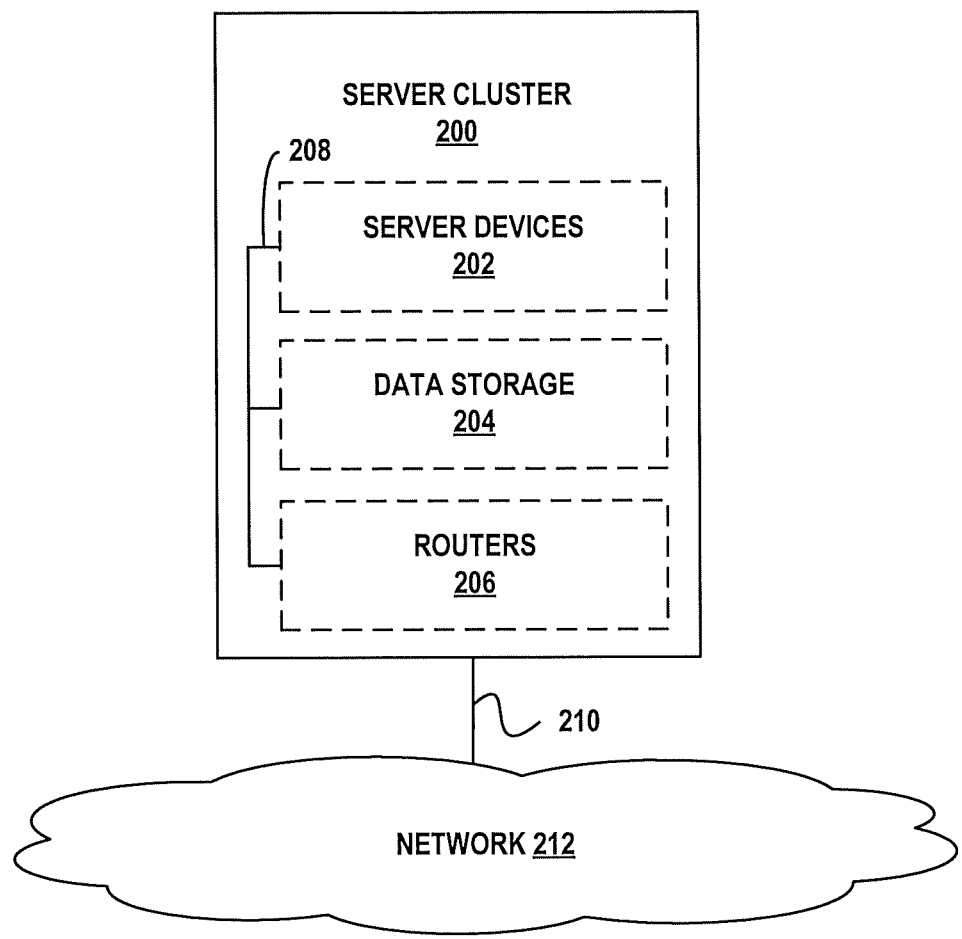
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
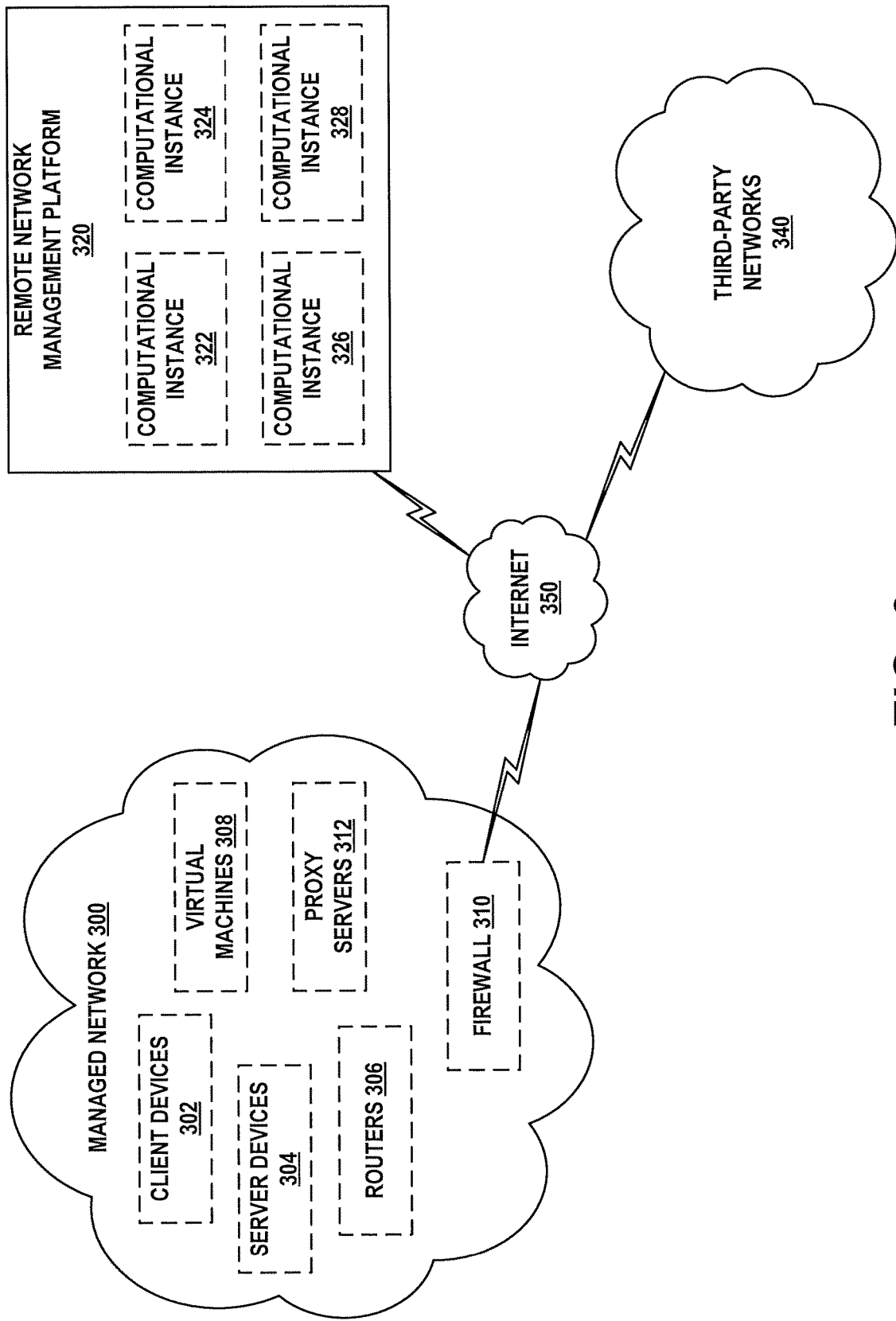
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
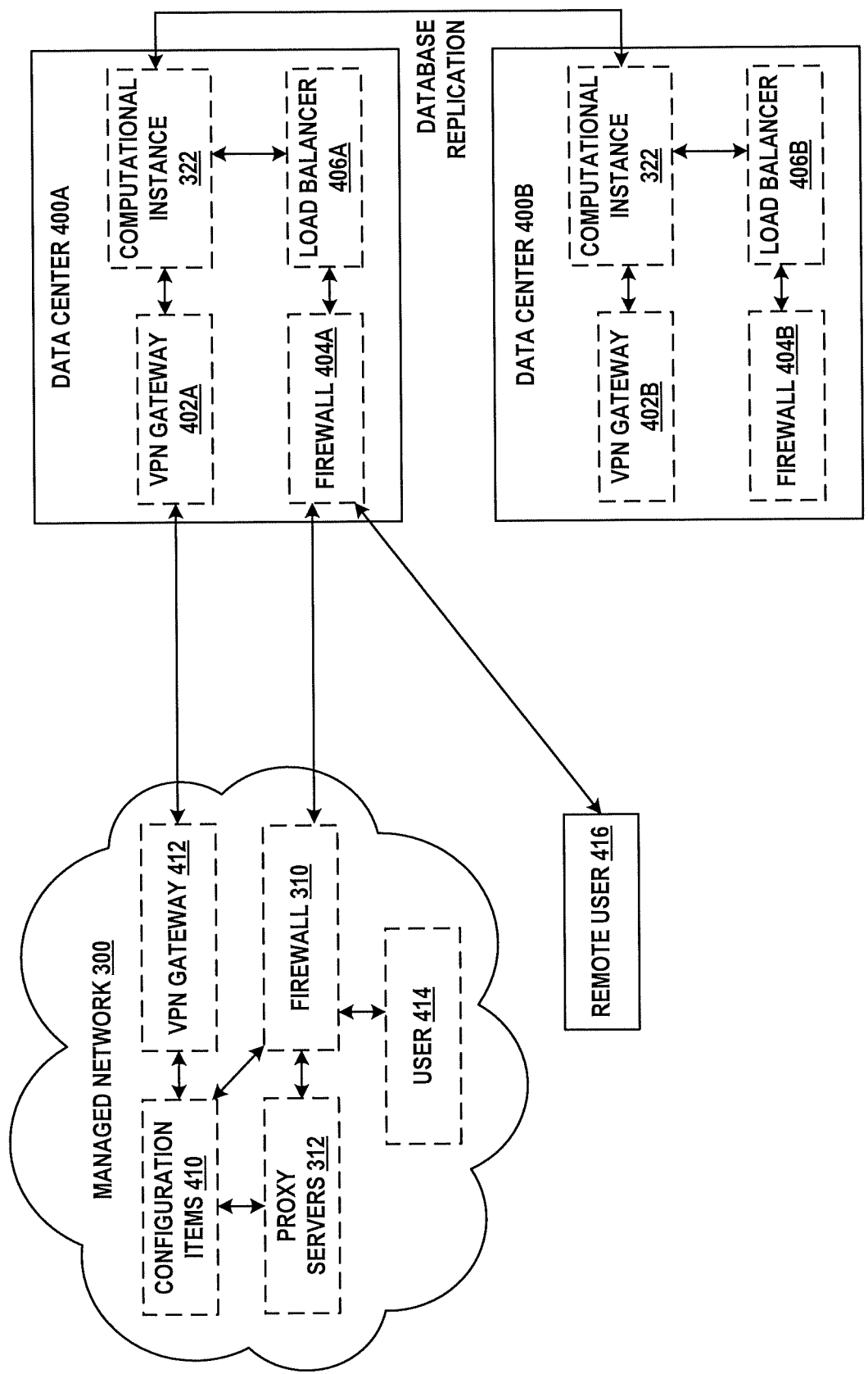
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
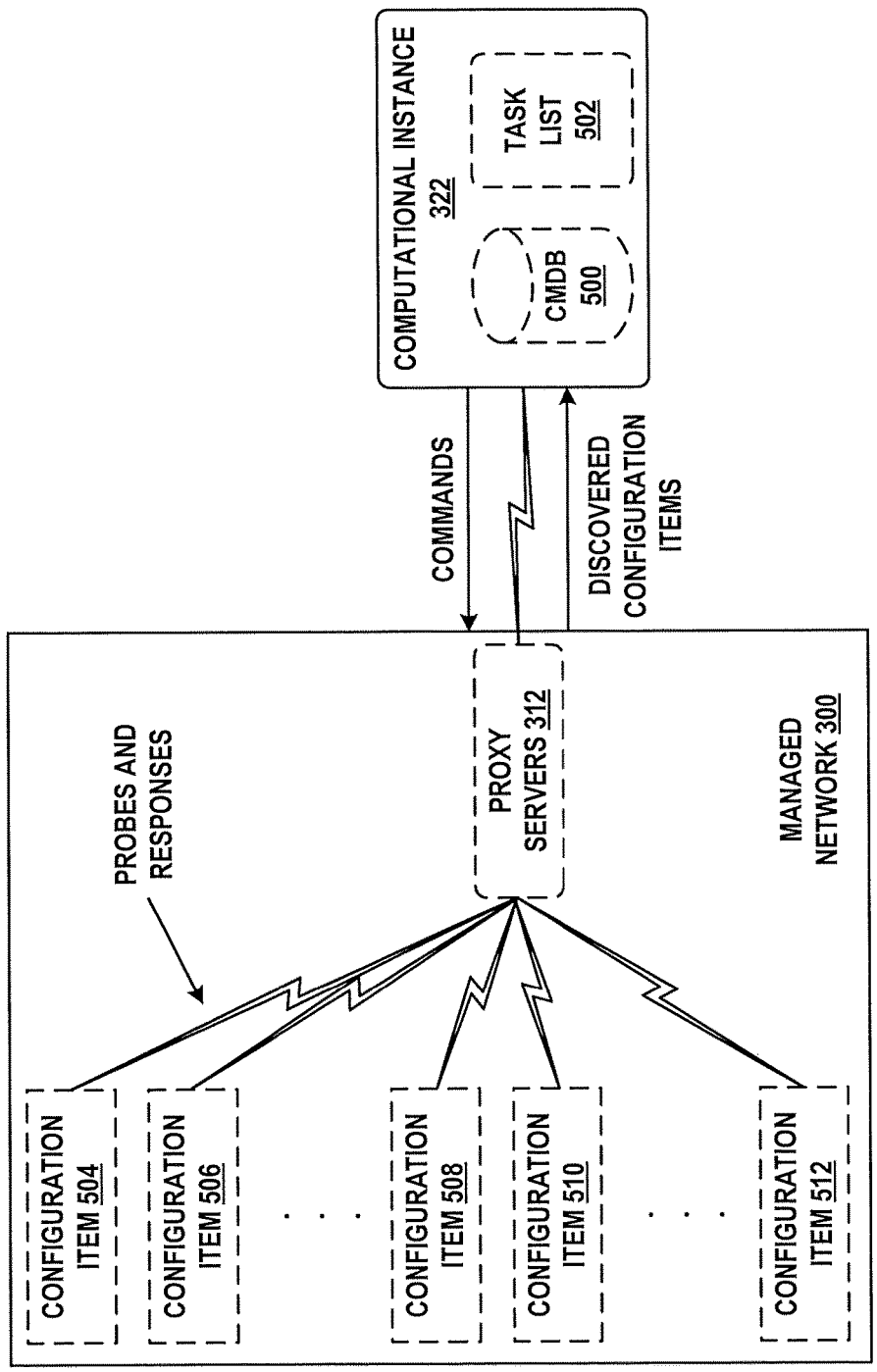
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
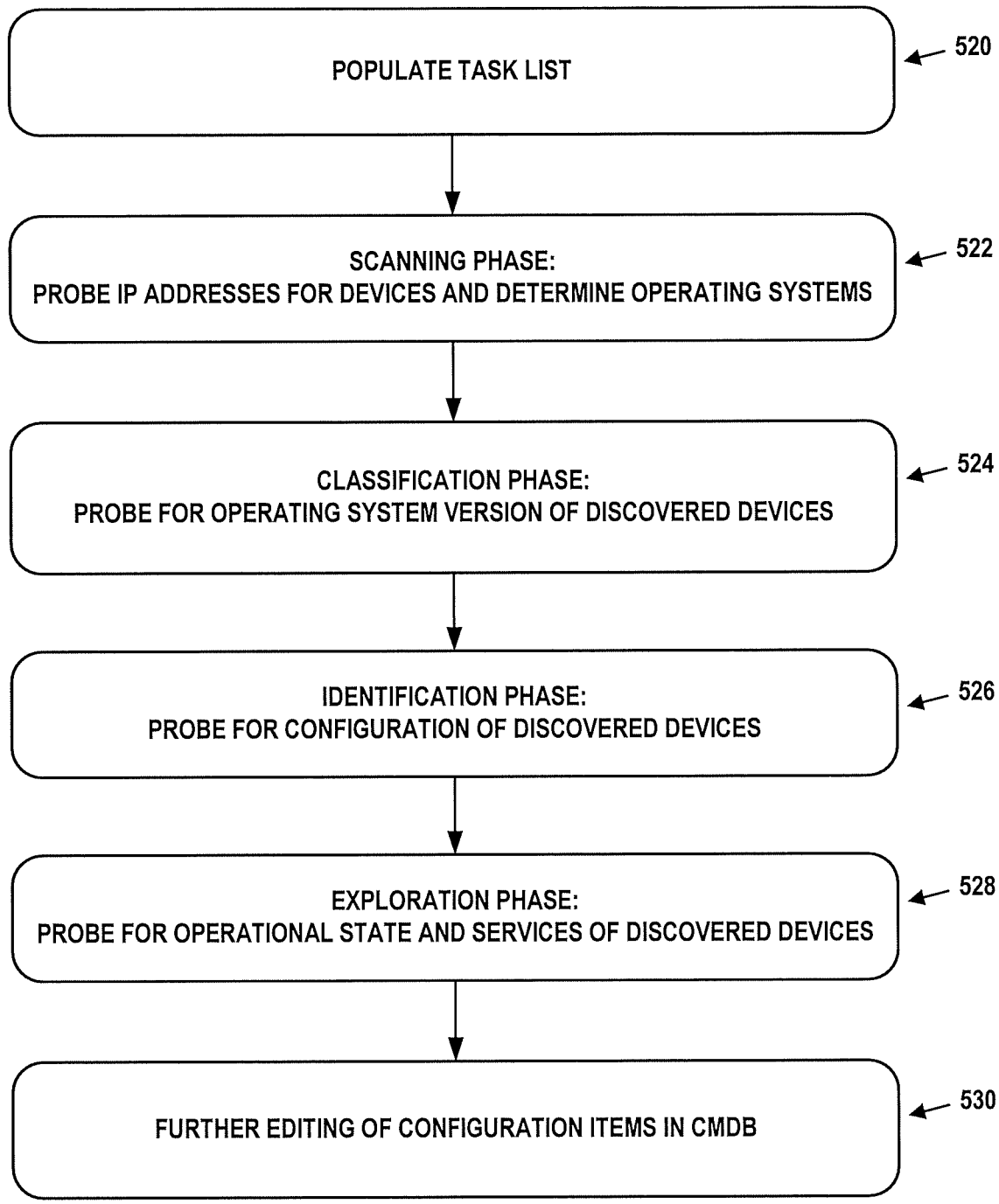
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE OFFLINE MODE

For purposes of the embodiments discussed herein, a "wireless communication device" may be any type of computing device that accesses a network by way of a wireless interface. Nonetheless, other types of devices may use and benefit from these embodiments.

As noted previously, use of mobile wireless devices, such as smartphones, smartwatches, tablets, and so on has become ubiquitous. As such, users of a remote network management platform may expect to be able to obtain access thereto from such wireless communication devices around the clock and from a variety of physical locations. At least two drawbacks, however, exist.

First, the relatively small screen size of a wireless communication device limits the amount of information that can be displayed at any one point in time on the device. For instance, a typical smartphone may have a diagonal screen size of 6 inches, whereas a desktop computer may be attached to a monitor with a 30 inch (or more) diagonal screen size. Thus, the amount and type of data displayed at any one point in time may be severely limited on wireless communication devices as opposed to desktop (or even laptop) computers. Notably, web pages provided by the remote network management platform may display appropriately on a large screen, but might be shrunk to a nearly unreadable size on the screen of a wireless communication device.

Second, connectivity of these wireless communication devices is not guaranteed and can be unreliable or intermittent. Wireless network signals can be weak, fade, or suffer from interference. Thus, whether on a wide area wireless network (such as a cellular network) or a local area wireless network (such as a Wifi network) wireless communication devices may experience poor coverage from time to time. As a result, these devices may be unable to access the remote network management platform in a reliable fashion or at all. An application experiencing such a problem may be unresponsive, slow to respond, or freeze. The user may become frustrated by such behavior and may be unable to determine whether any requests or updates made by way of the application will be properly processed.

The embodiments herein address these user interface and network connectivity problems by providing a native application executing on a wireless communication device. The native application is compiled or interpreted directly by the device by way of its operating system and/or supporting libraries. Unlike a generic web browser or applications that download for execution in a web browser, the native application is designed specifically for communicating with a computational instance of a remote network management platform. By way of this communication, a server device of the computational instance may provide content to be displayed and the arrangement thereof to the wireless communication device. Thus, content and/or arrangement can be designed to be easily readable even with the limited screen size of the wireless communication device.

Furthermore, the native application may be able to determine when the wireless communication device is offline. For instance, the native application may detect when one or more communication interfaces of the device are either turned off or not connected. In some cases, the wireless communication device may be determine that it is "offline" even when an interface is online or connected but unable to communicate at more than a pre-determined rate (e.g., less than 10 kilobits per second). Alternatively or additionally, the user may be able to place the device in an offline mode manually.

Along with the content and/or arrangement provided to the wireless communication device, the server device may also provide one or more scripts. Execution of one of these scripts may allow the native application to update its graphical user interface to reflect changes (e.g., due to navigation to changing values of displayed data) made by a user when the device is in offline mode. This allows the user to see the results of his or her changes immediately, and avoids errors and/or long delays during which the wireless communication device attempts to contact the server device when the former has poor or non-existent network connectivity. When the wireless communication device is once again online, the native application may transmit the user's requested changes to the server device, thereby synchronizing the content as displayed on the wireless communication device with the content as stored in the server device. The result is a dramatically improved user experience.

Figure 6:
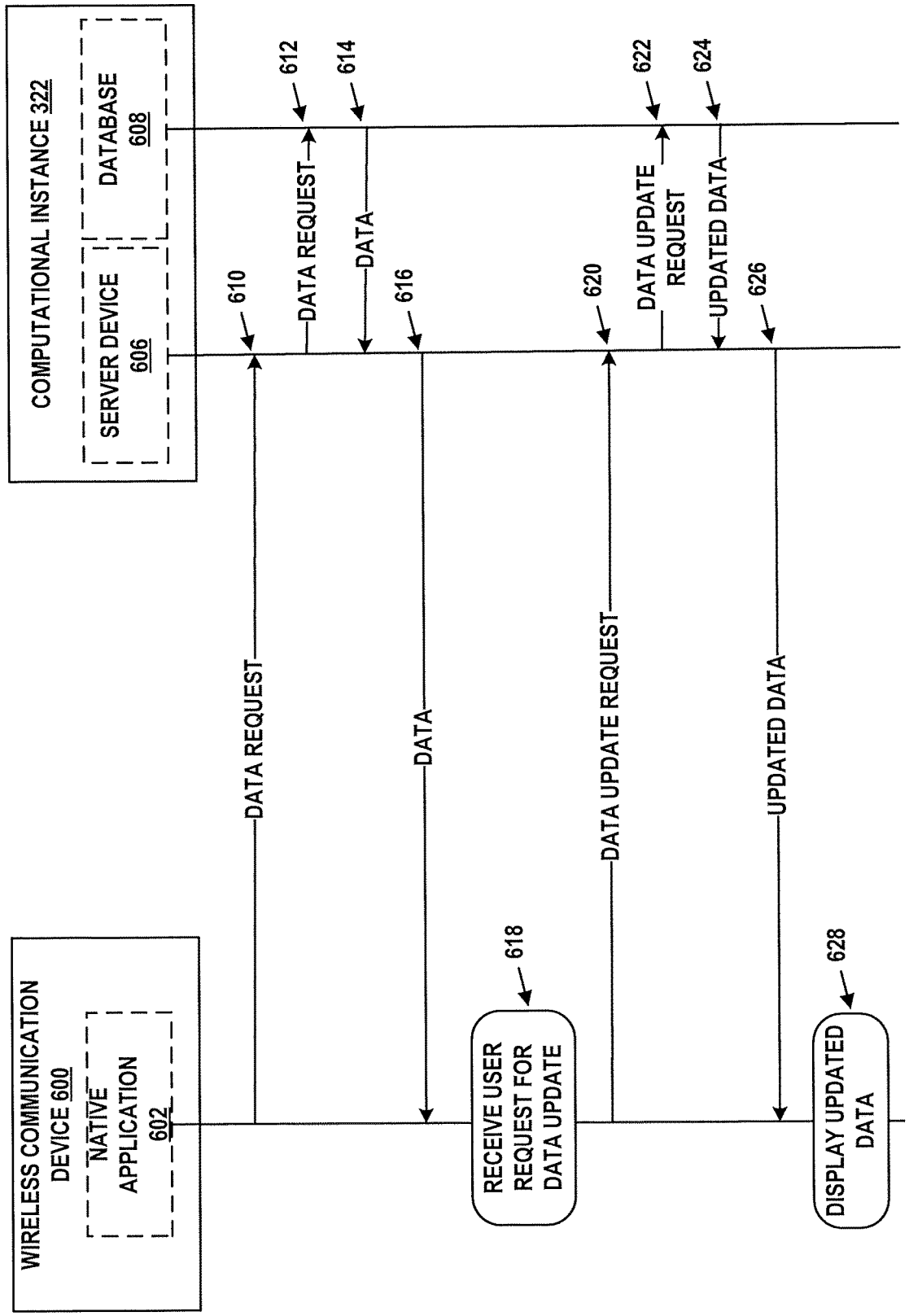
FIG. 6 is a message flow diagram, in accordance with example embodiments.
Figure 7A:
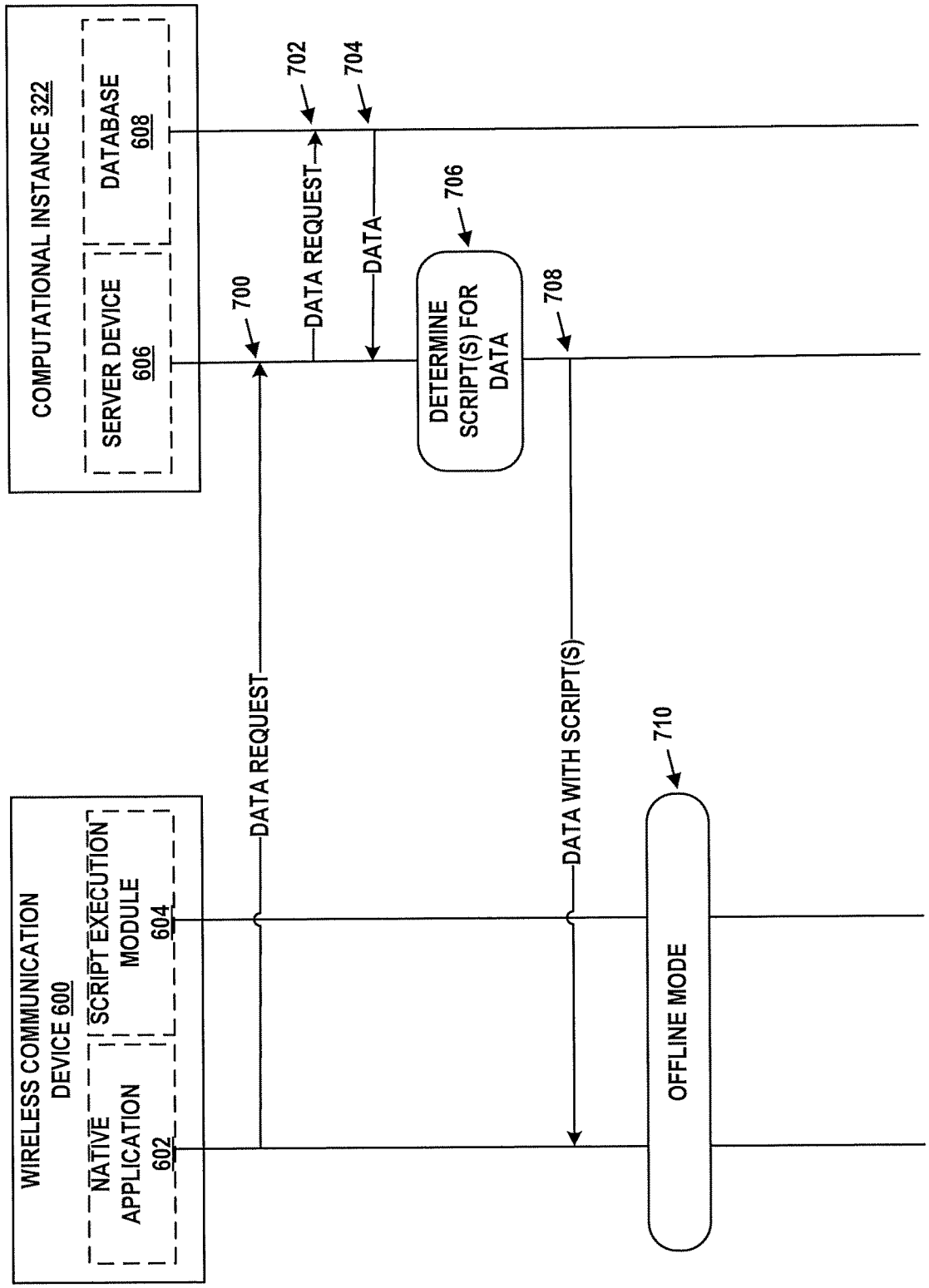
FIG. 7A is a message flow diagram, in accordance with example embodiments.
Figure 7B:
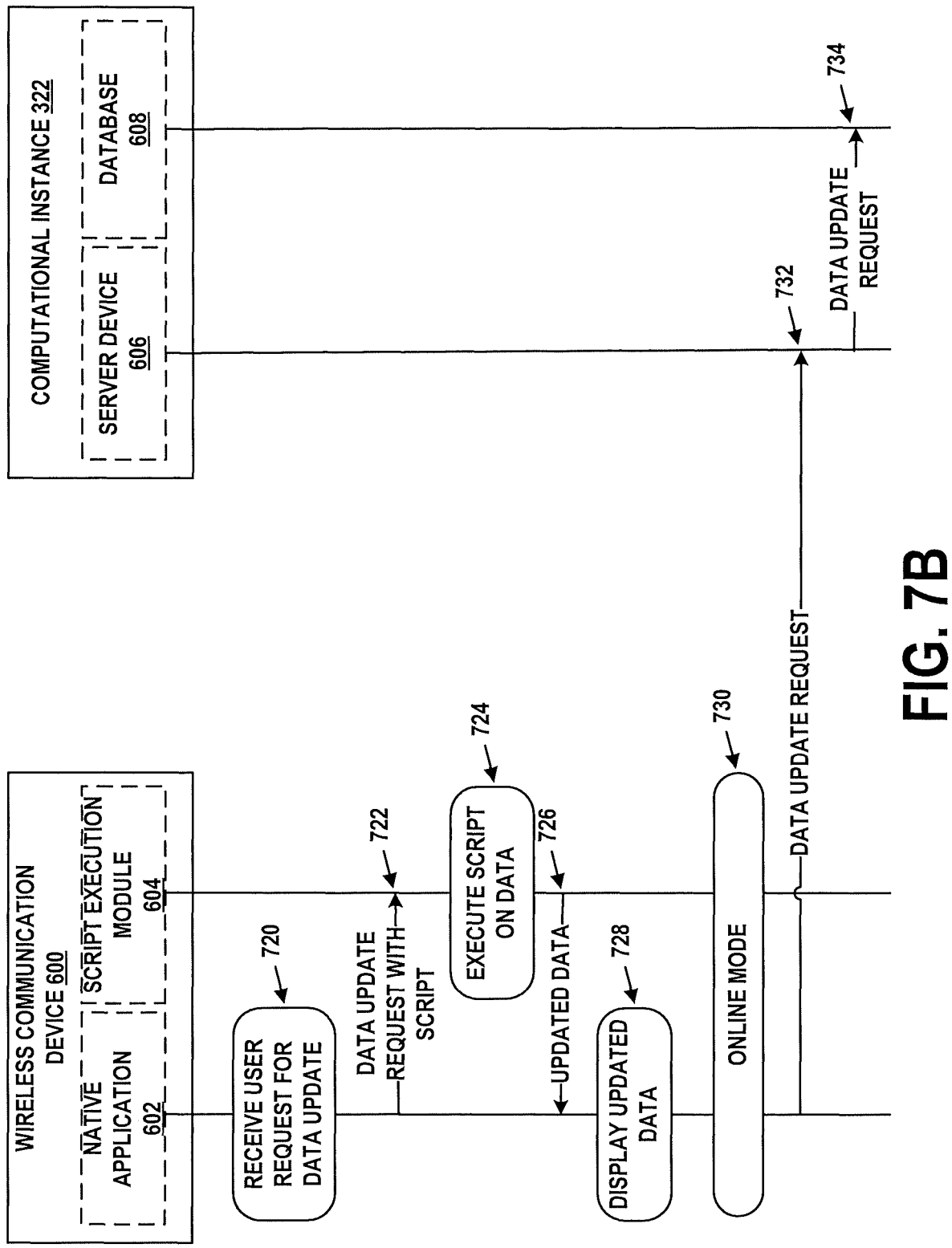
FIG. 7B is a message flow diagram, in accordance with example embodiments.

For sake of comparison, FIG. 6 depicts a transaction between the native application and a server device when the wireless communication device executing the native application is in online mode for the entire transaction, and then FIGS. 7A and 7B depict a similar transaction when the wireless communication device is in offline mode for part of the transaction.

In FIG. 6, wireless communication device 600 may include a processor, memory, one or more communication interfaces, a screen capable of displaying a graphical user interface (e.g., a touchscreen), and so on. Wireless communication device 600 may also contain, among other software modules, native application 602.

Wireless communication device 600 may be configured to communicate with server device 606, which is part of computational instance 322, for example. Server device 606 may, in turn, access database 608 to obtain information to transmit to wireless communication device 600, as well as to store information received from wireless communication device 600.

At step 610, native application 602 may transmit a data request to server device 606. The data request may be for data to display on a graphical user interface of native application 602, and may be transmitted in response to user activity.

At steps 612 and 614, server device 606 requests and receives the requested data from database 608. In some embodiments, server device 606 may omit these steps if it contains a copy of the requested data.

At step 616, server device 606 may transmit the requested data to native application 602. This data may include content for display on the graphical user interface as well as a defined arrangement of this content. In response to receiving the data, native application 602 may display the content on the graphical user interface in accordance with the arrangement. As an example, the content may be displayed as a vertical list of parameters and associated values.

At step 618, taking place some point after the content is displayed, native application 602 may receive a user request to update the data. For instance, the user may change the value of one of the displayed parameters.

Thus, at step 620, native application 602 may transmit, to server device 606, a data update request with a representation of the parameter as changed. At steps 622 and 624, server device 606 may transmit the updated data to database 608 and receive an acknowledgement that the data has been updated or a copy of the updated data.

At step 626, server device 606 may transmit, to native application 602, a copy of the updated data. This copy may also include any updates made to the overall content and layout of the graphical user interface due to the change in content. For example, if the parameter as changed takes up more vertical space in the graphical user interface, the updated graphical user interface may omit other information that was previously displayed in order to fit the parameter. At step 628, native application may refresh its graphical user interface to reflect any such updates.

Notably, native application 602 may be unable to transmit the data update request of 620 or refresh its graphical user interface if wireless communication device 600 is suffering from poor wireless coverage, non-existent wireless coverage, or network connectivity problems of another kind. Instead, native application 602 may display a progress indicator (such as an hourglass or a spinning pinwheel) while it is waiting for the updated data. Alternatively or additionally, native application 602 may display an error message indicating a lack of connectivity.

When this is the case, the user may be unable to determine whether server device 606 or database 608 received the updated data, and may also be unable to use native application 602 until a response is received from server device 606 or the transmission times out. This can lead to user frustration, delays in accomplishing tasks, and having to repeat tasks several times before it is clear that the tasks have been properly completed.

In order to address these drawbacks and limitations, FIGS. 7A and 7B depict a similar transaction as that of FIG. 6, but with offline mode supported. Notably, wireless communication device 600 includes script execution module 604. Despite their being shown as separate elements in FIG. 7A, script execution module 604 may be integrated into and a part of native application 602.

At step 700, native application 602 may transmit a data request to server device 606. The data request may be for data to display on a graphical user interface of native application 602, and may be transmitted in response to user activity.

At steps 702 and 704, server device 606 requests and receives the requested data from database 608. In some embodiments, server device 606 may omit these steps if it contains a copy of the requested data.

At step 706, server device 606 may determine that one or more scripts should be delivered to native application 602. These scripts may each be associated with a particular piece of the data, or a single script may be associated with all of the data. Each script is executable to update part or all of a graphical user interface displaying at least some of the data.

At step 708, server device 606 may transmit the requested data to native application 602. This data may include content for display on the graphical user interface, a defined arrangement of this content, and the script(s). In some embodiments, the content, arrangement, and scripts may be formatted according to JavaScript Object Notation (JSON). In response to receiving the data, native application 602 may display the content on the graphical user interface in accordance with the arrangement.

At step 710 (which may take place before, after, or in response to reception of the data of step 708), native application 602 determines that wireless communication device 600 is in offline mode. This determination may be made in several ways. For instance, native application 602 may query an application programming interface (API) of a library or operating system of wireless communication device 600 to determine that one or more communication interfaces of wireless communication device 600 are deactivated. Alternatively or additionally, the API may be queried to determine that one or more of these interfaces are activated but disconnected from wireless networks. Alternatively or additionally, the API may be queried to determine that a user has placed wireless communication device 600 in an offline mode that prevents all wireless communication. Other possibilities exist.

Turning to FIG. 7B, at step 720, native application 602 may receive a user request to update the data being displayed on the graphical user interface. At step 722, in response to this request and due to the offline mode being detected, native application 602 may provide the data update from the user, along with the script(s) associated with the updated data, to script execution module 604.

At step 724, script execution module 604 may execute the script(s) on the data. This may, for example, change the content and/or arrangement encoded by the data. As noted previously, script execution module 604 may be a standalone module or integrated into native application 602.

At step 726, script execution module 604 may provide the updated data to native application 602. At step 728, possibly in response to receiving the updated data, native application 602 may display the data as updated. Advantageously, this makes the graphical user interface of native application 602 responsive to input even when wireless communication device 600 is offline.

At step 730, wireless communication device 600 leaves offline mode and enters online mode. Doing so may involve activating a communication interface of wireless communication device 600, a communication interface of wireless communication device 600 gaining access to a wireless network, and/or a user of wireless communication device 600 placing wireless communication device 600 in online mode. Native application 602 may detect wireless communication device 600 entering online mode by receiving a message or other indication from the operating system of wireless communication device 600 or another module.

At step 732, possibly in response to wireless communication device 600 entering online mode, native application 602 may transmit the data update request (preferably without the script) to server device 606. At step 734, server device 606 in turn may, in turn, provide a related update to database 608. In this fashion, database 608 is updated based on the most recent input from the user of wireless communication device 600. In this fashion, the data display on the graphical user interface of native application 602 and stored in database 608 may be synchronized.

VI. EXAMPLE GRAPHICAL USER INTERFACES

FIGS. 8A-8D provide an illustrative example of how a graphical user interface of a native application could be updated while a wireless communication device is in offline mode. Nonetheless, the embodiments herein can operate with a wide variety of user interface layouts and designs, and should not be viewed as limited to this example.

To make these graphical user interfaces more concrete, they depict information related to IT trouble tickets. These tickets may be opened by technology users of an enterprise who are having difficulties with hardware or software services. Each ticket may include fields defining: a unique number or code assigned to the ticket, the identity of the user (or caller) who opened the ticket, a brief description of the problem that the user experienced, the time at which the ticket was opened, the location of the user, the category of problem (e.g., hardware or software), to whom the ticket is assigned, the priority of the ticket, and the state of the ticket (e.g., new, being assessed, in progress, resolved, closed).

Figures 8A, 8B:
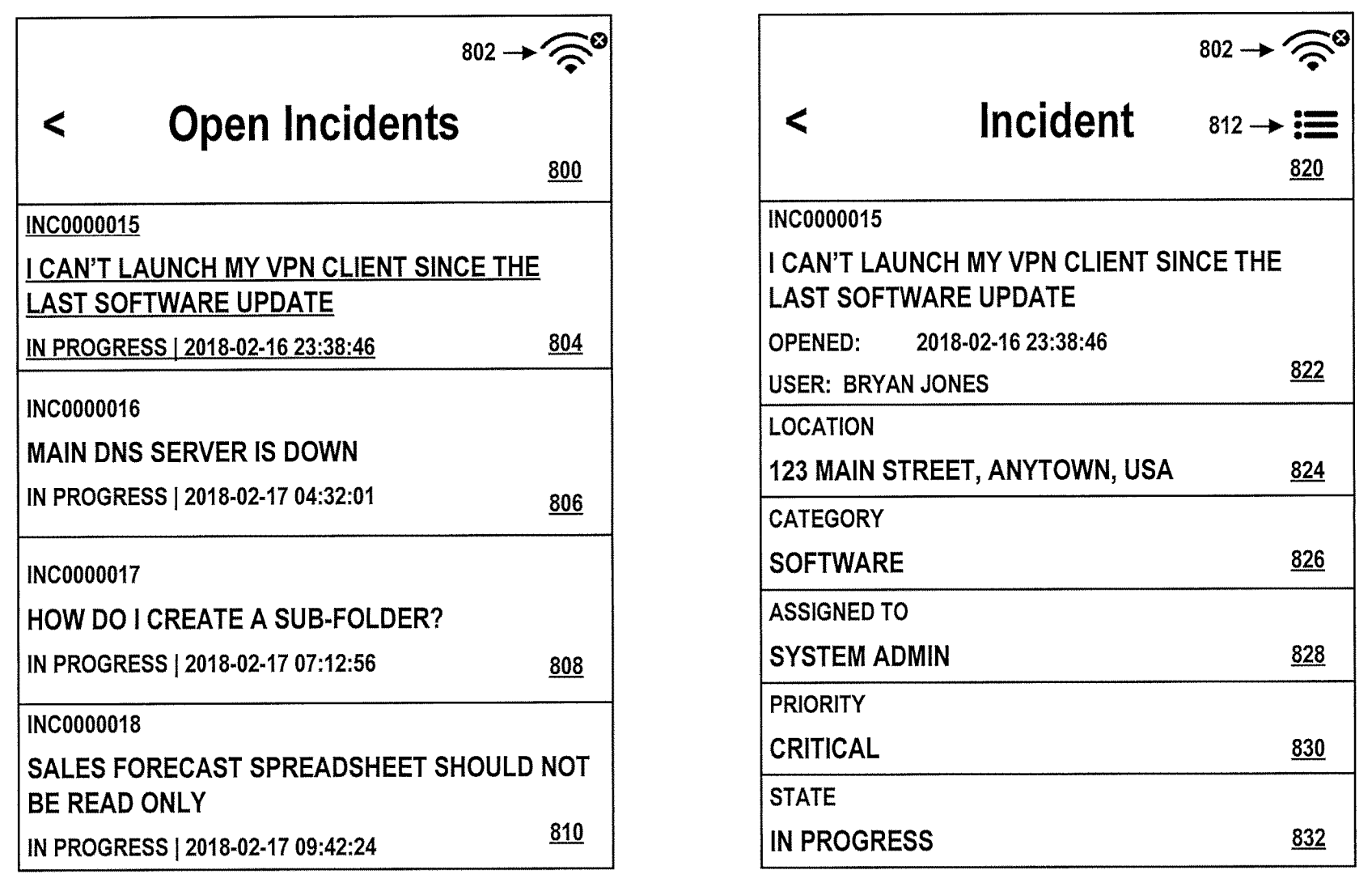

FIG. 8A depicts a graphical user interface of a wireless communication device displaying a list of open incidents. The content of this graphical user interface contains information related to a number of incidents. Notably, this information includes ticket numbers, brief descriptions, ticket states, and the times at which the tickets were opened.

The arrangement of this content is a single column of cells, each cell containing information related to a particular ticket. Other arrangements may be used instead, including multiple columns and/or rows of cells, such as an m×n grid of cells. Within each cell, each unit of text or graphical icon can be individually assigned a location. For instance, in cell 800, the text "Open Incidents" is vertically and horizontally centered, while the wireless connectivity icon 802 is placed in the upper right corner.

Furthermore, font and color schemes may be defined individually for a cell or for a group of cells. These schemes may set forth the size, style, and color of the text in the cells, the background color of the cells, and various other properties such as what a cell looks like when it is selected and so on.

Notably, icon 802 indicates that there is no wireless connectivity (i.e., the "X" atop the icon means that the wireless communication device is disconnected from a wireless network). Thus, the wireless communication device is in offline mode. The graphical user interface of FIG. 8A may have been displayed before or after the wireless communication device entered the offline mode.

Cells 804, 806, 808, and 810 each displays information related to a single ticket. As discussed above, this information includes ticket numbers, brief descriptions, ticket states, and the times at which the tickets were opened.

Despite only some of the information related to tickets being displayed in FIG. 8A, the native application may have requested and received more information that is currently not displayed. This may allow the native application to facilitate navigation to different user interfaces even though the wireless communication device is in offline mode. For example, turning back to FIG. 7A for a moment, the native application may request and receive some or all information related to a number of tickets at step 700. This information may be provided to the native application at step 708, and may include one or more scripts that define navigation between user interfaces displaying the tickets. In particular, a script may define what the native application is to display on a next graphical user interface when a specific item of the current graphical user interface is selected.

As an example, cell 804 is shown as selected (as depicted by underlining) in FIG. 8A. Responsively to this selection and the wireless communication device being in offline mode, the native application may cause a script associated with cell 804 to be executed. This script may cause the graphical user interface of FIG. 8B to be displayed. Notably, this graphical user interface depicts a more detailed version of the ticket in cell 804, and may use information received at step 708.

Cell 820 of FIG. 8B indicates that this graphical user interface is related to a single incident, and also includes icon 812. Cell 822 identifies that ticket number, brief description, time at which the ticket was opened, and the user who opened the ticket. Cell 824 identifies the user's location. Cell 826 identifies the category of the ticket. Cell 828 identifies to whom the ticket is assigned. Cell 830 identifies the priority of the ticket. Cell 832 identifies the state of the ticket. In general, more or less information, or different information, could be displayed in a graphical user interface that provides details of a ticket.

Icon 812 may be selectable to display a drop-down menu 840 containing ways to change the information related to the ticket. For example, FIG. 8C depicts the same graphical user interface as FIG. 8B, but with icon 812 selected and drop-down menu 840 displayed. Drop-down menu 840 provides the user with options to resolve the incident (e.g., change the state to "resolved"), reassign the incident (e.g., change person or group to whom the incident is assigned), change the category of the incident, and change the priority of the incident. Again, the native application may derive this menu by executing a script associated with the selection of icon 812, and the script may produce drop-down menu 840.

FIG. 8C also depicts that the resolve option of drop-down menu 840 has been selected. Accordingly, FIG. 8D depicts the graphical user interface of FIGS. 8B and 8C updated to reflect this change. Notably, cell 832 is updated to indicate that the state of the ticket is now "resolved". Once more, the native application may derive this change by executing a script associated with the selection of the resolve option of drop-down menu 840.

Advantageously, these embodiments allow a graphical user interface of an application to be updated and changed without requiring communication with a server device. This provides for a more responsive and useful user experience. Nonetheless, when the wireless communication device returns to online mode, the native application may automatically and/or responsively update the server device with the changes made by the user. In the case of the example shown in FIGS. 8A-8D, the service device would be provided with an update of the state of ticket INC0000015.

VII. EXAMPLE ENCODING OF CONTENT, ARRANGEMENTS THEREOF, AND SCRIPTS

As noted previously, the content of a graphical user interface, its arrangement, and any scripts that are be triggered by selection of elements thereon can be specified in data transmitted to a native application (e.g., during step 708 of FIG. 7A). While this data can be formatted according to various protocols, one possible formatting is in accordance with JSON. Particularly, JSON provides a hierarchical structure in which these aspects can be specified.

A JSON file that contains all of the information regarding the graphical user interfaces of FIGS. 8A-8D and the scripts to navigate therebetween could be quite large (e.g., over 1000 lines of text). For sake of simplicity, a few sections of such a JSON file are discussed below.

FIG. 9A depicts an example JSON specification 900 of an arrangement of content. Notably, this example defines text placement, text size, and text color for various cells in FIGS. 8A-8D.

FIG. 9B depicts an example JSON specification 902 of cell 822 of FIG. 8B. Particularly, this example defines the ticket number, brief description, the time that the ticket was opened, and the user's name. The example also defines the static text in this cell, such as "Opened" and "User".

The scripts, which may also be contained as one or more elements of the JSON file, may be able to change values in the file, as well as implement transitions from one graphical user interface to another. Keeping with the example of FIGS. 8B-8D, FIG. 9C shows how a script may modify JSON content. For instance, when the user changes the state of the incident from "In Progress" to "Resolved", JSON snippet 904 (from the JSON file delivered to the native application) may be changed to JSON snippet 906.

Figures 9C, 9D:
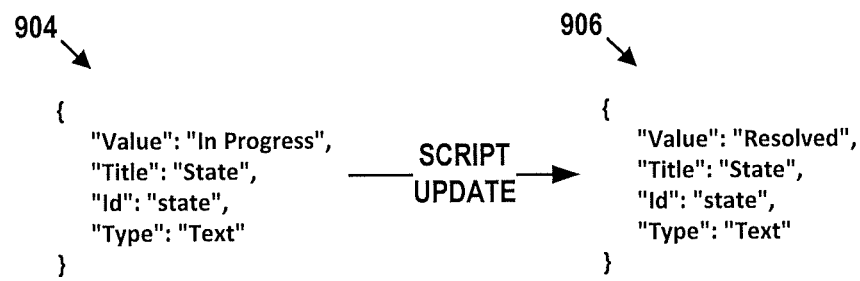
FIG. 9C depicts a scripted modification of part of a JSON file, in accordance with example embodiments.
FIG. 9D depicts a pseudocode representation of logic that can perform the scripted modification of FIG. 9C, in accordance with example embodiments.

FIG. 9D depicts a pseudocode representation 908 of logic that can perform such an update. The function Resolve takes two arguments—the target item in the JSON file to be updated (targetitem) and the value to be written ("Resolved"). The outer "for" loop iterates through a list of items until the target item is found. The inner "for" loop iterates through the cells of the target item until the cell with an id of "state" is found. Then, the value of this cell is changed to "Resolved". In some embodiments, passing the value to be written to Resolve is optional because it may be determined implicitly, since the goal of the function is to change the state of the target item to "Resolved".

VIII. EXAMPLE OPERATIONS

Figure 10:
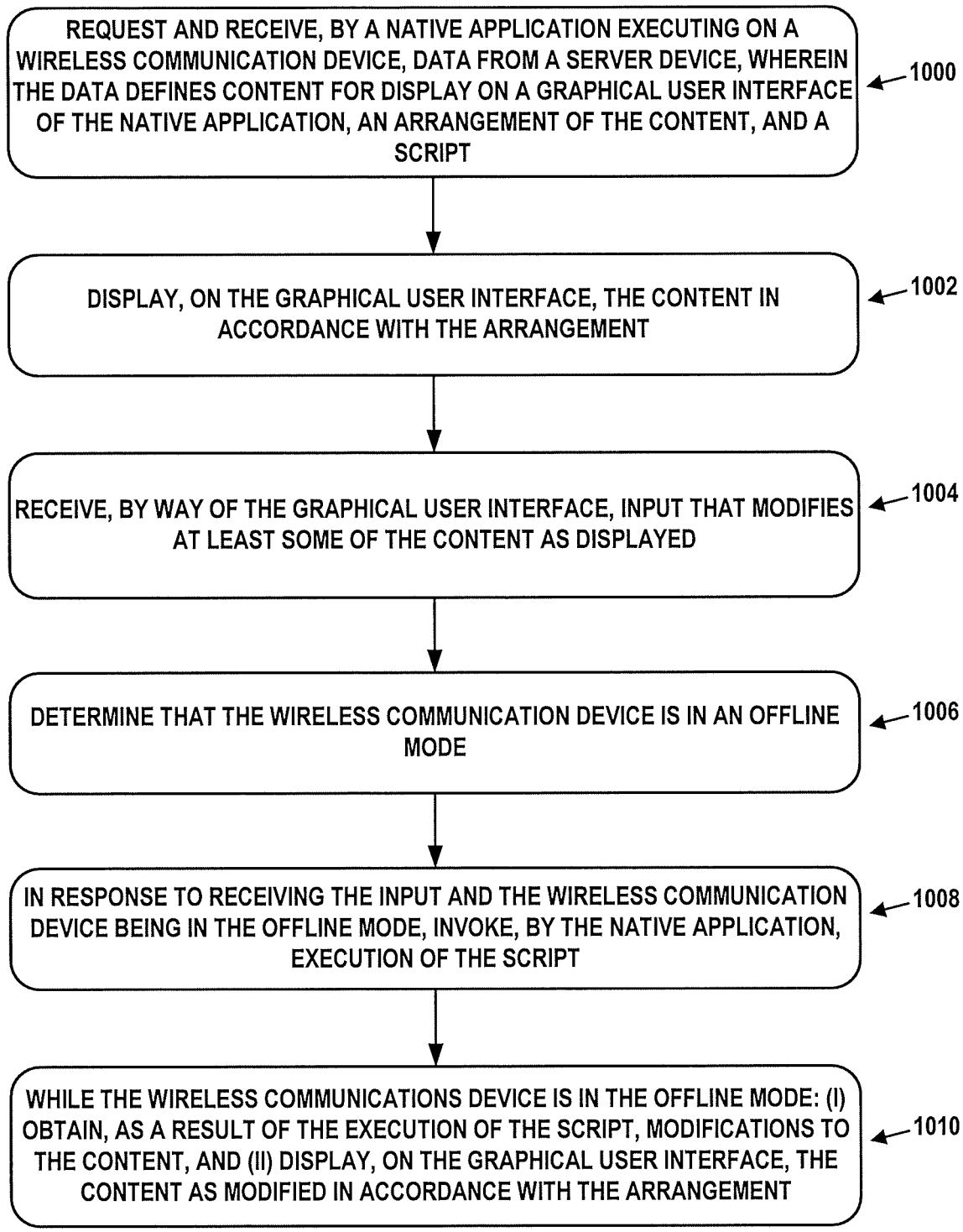
FIG. 10 is a flow chart, in accordance with example embodiments.

FIG. 10 is a flow chart illustrating an example embodiment. The process illustrated by FIG. 10 may be carried out by software provide on or downloaded to a wireless communication device or some other type of device exemplified by computing device 100. However, the process can be carried out by other types of devices or device subsystems.

The embodiments of FIG. 10 may be simplified by the removal of any one or more of the features shown therein. Further, these embodiments may be combined with features, aspects, and/or implementations of any of the previous figures or otherwise described herein.

Block 1000 may involve requesting and receiving, by a native application executing on a wireless communication device, data from a server device, where the data defines content for display on a graphical user interface of the native application, an arrangement of the content, and a script.

Block 1002 may involve displaying, on the graphical user interface, the content in accordance with the arrangement.

Block 1004 may involve receiving, by way of the graphical user interface, input that modifies at least some of the content as displayed.

Block 1006 may involve determining that the wireless communication device is in an offline mode.

Block 1008 may involve, possibly in response to receiving the input and the wireless communication device being in the offline mode, invoking, by the native application, execution of the script.

Block 1010 may involve, while the wireless communications device is in the offline mode: (i) obtaining, as a result of the execution of the script, modifications to the content, and (ii) displaying, on the graphical user interface, the content as modified in accordance with the arrangement.

The embodiments may further involve obtaining, as a result of the execution of the script, modifications to the arrangement, where displaying the content as modified comprises displaying the content as modified in accordance with the arrangement as modified.

Alternatively or additionally, the embodiments may further involve, after displaying the content as modified, determining that the wireless communication device is in an online mode, and transmitting, to the server device, the content as modified.

In some embodiments, the content is in JavaScript Object Notation (JSON) format, and where the script is implemented in JavaScript.

In some embodiments, the content consists of cells containing information, where some of the cells contain an identifier, and where the script is configured to change the information in the cells containing the identifier. The identifier may provide a way of specifying, to the script, which cells are to be updated. For instance, the script may be configured to replace a value of a first JSON element with another value if that JSON element contains a particular identifier.

In some embodiments, the arrangement defines a placement of units of the content on the graphical user interface, and where displaying the content in accordance with the arrangement comprises displaying the units of content in positions on the graphical user interface determined by the placement.

In some embodiments, determining that the wireless communication device is in the offline mode comprises detecting that the communication interface is not activated. Alternatively or additionally, determining that the wireless communication device is in the offline mode comprises detecting that the communication interface is activated but lacks network connectivity. Alternatively or additionally, determining that the wireless communication device is in the offline mode comprises determining that a user of the wireless communication device has placed the wireless communication device in the offline mode.

In some embodiments, the script is executed by a script execution module that is part of the native application. Alternatively or additionally, the script is executed by a script execution module that is separate from the native application.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A wireless communication device comprising:
   a communication interface;
   a screen configured to display a graphical user interface of a native application;
   a processor; and
   memory containing instructions of the native application that, when executed by the processor, cause the native application to perform operations including:
      while the wireless communication device is in an online mode:
         requesting and receiving, by way of the communication interface, data from a server device, wherein the data defines content for display on the graphical user interface, an arrangement of the content, and one or more scripts associated with the content, wherein the arrangement of the content defines a layout of the content on the graphical user interface;
      displaying, on the graphical user interface, the content in accordance with the arrangement of the content;
      determining that the wireless communication device is in an offline mode; and
      while the wireless communication device is in the offline mode:
         receiving, by way of the graphical user interface, a request to update the content displaying on the graphical user interface, wherein the request is configured to trigger modifications to the arrangement of the content as displayed;
         in response to receiving the request to update the content displaying on the graphical user interface, invoking execution of the one or more scripts associated with the content;
         updating, as a result of the execution of the one or more scripts associated with the content, the graphical user interface to reflect the modifications to the arrangement of the content; and
         displaying, on the graphical user interface, the content as modified in accordance with the modifications to the arrangement of the content.

2. The wireless communication device of claim 1, wherein the operations include:
   after displaying the content as modified, determining that the wireless communication device is in the online mode; and
   transmitting, to the server device, the content as modified.

3. The wireless communication device of claim 1, wherein the content is in JavaScript Object Notation (JSON) format, and wherein the one or more scripts associated with the content are implemented in JavaScript.

4. The wireless communication device of claim 1, wherein the content comprises information contained in cells, wherein some of the cells contain an identifier, and wherein the one or more scripts associated with the content are configured to change the information in the cells containing the identifier.

5. The wireless communication device of claim 1, wherein the arrangement of the content defines a placement of units of the content on the graphical user interface, and wherein displaying the content in accordance with the arrangement of the content comprises displaying the units of the content in positions on the graphical user interface determined by the placement.

6. The wireless communication device of claim 1, wherein determining that the wireless communication device is in the offline mode comprises detecting that the communication interface is not activated.

7. The wireless communication device of claim 1, wherein determining that the wireless communication device is in the offline mode comprises detecting that the communication interface is activated but lacks network connectivity.

8. The wireless communication device of claim 1, wherein determining that the wireless communication device is in the offline mode comprises determining that a user of the wireless communication device has placed the wireless communication device in the offline mode.

9. The wireless communication device of claim 1, wherein the one or more scripts associated with the content are executed by a script execution module that is part of the native application.

10. The wireless communication device of claim 1, wherein the one or more scripts associated with the content are executed by a script execution module that is separate from the native application.

11. A computer-implemented method comprising:
    while a wireless communication device is in an online mode:
       requesting and receiving, by a native application executing on the wireless communication device, data from a server device, wherein the data defines content for display on a graphical user interface of the native application, an arrangement of the content, and one or more scripts associated with the content, wherein the arrangement of the content defines a layout of the content on the graphical user interface;
    displaying, on the graphical user interface, the content in accordance with the arrangement of the content;
    determining that the wireless communication device is in an offline mode; and
    while the wireless communication device is in the offline mode:
       receiving, by way of the graphical user interface, a request to update the content displaying on the graphical user interface, wherein the request is configured to trigger modifications to the arrangement of the content as displayed;
       in response to receiving the request to update the content displaying on the graphical user interface, invoking, by the native application, execution of the one or more scripts associated with the content;
       updating, as a result of the execution of the one or more scripts associated with the content, the graphical user interface to reflect the modifications to the arrangement of the content; and displaying, on the graphical user interface, the content as modified in accordance with the modifications to the arrangement of the content.

12. The computer-implemented method of claim 11, comprising:
after displaying the content as modified, determining that the wireless communication device is in the online mode; and
transmitting, to the server device, the content as modified.

13. The computer-implemented method of claim 11, wherein the content comprises information contained in cells, wherein some of the cells contain an identifier, and wherein the one or more scripts associated with the content are configured to change the information in the cells containing the identifier.

14. The computer-implemented method of claim 11, wherein the arrangement of the content defines a placement of units of the content on the graphical user interface, and wherein displaying the content in accordance with the arrangement of the content comprises displaying the units of the content in positions on the graphical user interface determined by the placement.

15. The computer-implemented method of claim 11, wherein determining that the wireless communication device is in the offline mode comprises detecting that a communication interface of the wireless communication device is not activated.

16. The computer-implemented method of claim 11, wherein determining that the wireless communication device is in the offline mode comprises detecting that a communication interface of the wireless communication device is activated but lacks network connectivity.

17. The computer-implemented method of claim 11, wherein determining that the wireless communication device is in the offline mode comprises determining that a user of the wireless communication device has placed the wireless communication device in the offline mode.

18. An article of manufacture including a non-transitory computer-readable medium, having stored thereon program instructions that, upon execution by a wireless communication device, cause the wireless communication device to perform operations comprising:
while the wireless communication device is in an online mode:
requesting and receiving, by a native application executing on the wireless communication device, data from a server device, wherein the data defines content for display on a graphical user interface of the native application, an arrangement of the content, and one or more scripts associated with the content, and wherein the arrangement of the content defines a layout of the content on the graphical user interface;
displaying, on the graphical user interface, the content in accordance with the arrangement of the content;
determining that the wireless communication device is in an offline mode; and
while the wireless communication device is in the offline mode:
receiving, by way of the graphical user interface, a request to update the content displaying on the graphical user interface, wherein the request is configured to trigger modifications to the arrangement of the content as displayed;
in response to receiving the request to update the content displaying on the graphical user interface, invoking, by the native application, execution of the one or more scripts associated with the content;
updating, as a result of the execution of the one or more scripts associated with the content, the graphical user interface to reflect the modifications to the arrangement of the content; and
displaying, on the graphical user interface, the content as modified in accordance with the modifications to the arrangement of the content.

\* \* \* \* \*